Figure 1:
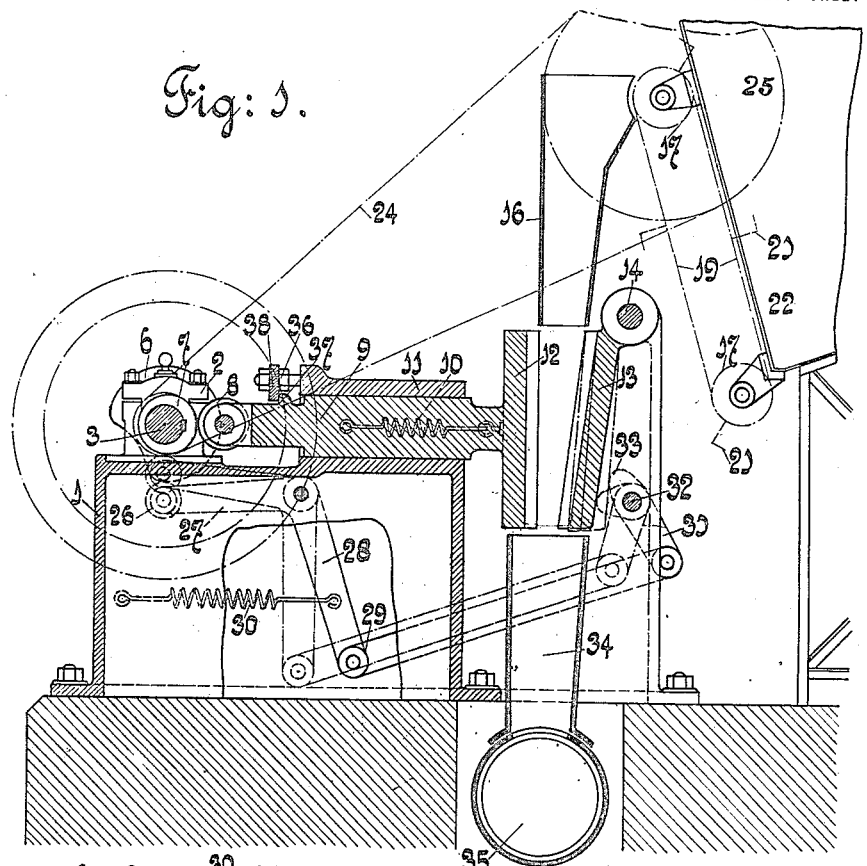

J. C. H. VAN DÜYL.
NUT OPENING MACHINE.
APPLICATION FILED JUNE 9, 1914.

1,243,572.

Patented Oct. 16, 1917.
2 SHEETS—SHEET 1.

Witnesses
M. E. McDade

Inventor
Josua C. H. van Düyl
By: Attorney

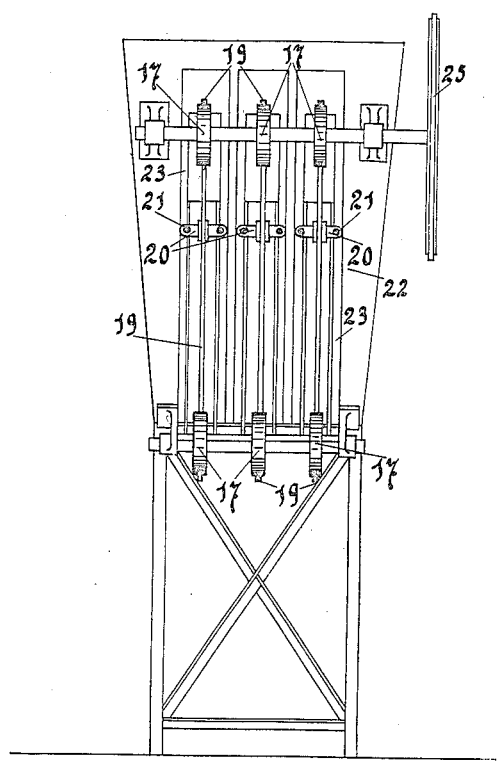
Fig: 3.

UNITED STATES PATENT OFFICE.

JOSUA CORNELIS HENDRIKUS VAN DÜYL, OF ROTTERDAM, NETHERLANDS.

NUT-OPENING MACHINE.

1,243,572. Specification of Letters Patent. Patented Oct. 16, 1917.

Application filed June 9, 1914. Serial No. 844,037.

*To all whom it may concern:*

Be it known that I, JOSUA CORNELIS HENDRIKUS VAN DÜYL, a subject of the Queen of the Netherlands, residing at Rotterdam, Nieuwe Haven, N. Z. 35 C, Kingdom of the Netherlands, have invented certain new and useful Improvements in Nut-Opening Machines, of which the following is a specification.

This invention relates to a machine for cracking or opening cohune nuts which have a very hard thick shell and a comparatively small oily kernel. Since the shell forms by far the largest and heaviest part of the nut, the cost of carrying the nuts from Central America to Europe is high in comparison with the profit to be obtained from the oil. For this reason attempts have been made to produce a machine whereby the nuts can be cracked at the place where they are found, in order that only the valuable kernel has to be transported and the relation between the cost of transport and the profit becomes more advantageous.

For the cracking or opening of nuts generally and more especially for the cracking of cohune nuts, several machines are known, which however have not been found successful in practice.

The difficulties to be overcome in the cracking of extremely hard shells are as follows:—

On the one hand, for the cracking of the hard shell, a very powerful blow or pressure is necessary, and on the other hand the kernel of the nut should not be crushed in the cracking of the shell, since crushed kernels are liable to rot and thus affect both the quantity and quality of the oil obtained. In order to prevent crushing of the kernel, it is necessary that the blow falling on the shell shall not be transmitted through the shell to the kernel. The minimum distance between the parts crushing the shell is thus clearly connected with the size of the nut. On the one hand, if the distance is too small, the kernel is damaged and on the other hand, if the distance is too great, the shell is not sufficiently opened. Thus two disadvantages are to be avoided and for this purpose in some known machines certain elements are adjusted to various sizes of nut and the nuts sorted according to their size by separate sorting machines are cracked in corresponding cracking machines.

In order to obviate this preliminary sorting a machine has been constructed wherein the nuts are cracked between jaws which inclose a space which contracts downward. This machine has for its object to support the nuts which fall between these jaws on bearing surfaces corresponding to their size. The larger nuts remain hanging at the top between the jaws and the smaller ones sink farther down. Thus with suitable movement of and feeding of the nuts to the jaws, it is possible to crack every nut without damaging a single kernel. In a known machine based on this principle and to which machine the present invention relates, the jaw with a vertical pressure surface is reciprocated by means of a lever which at one end slides on a camwheel, while the other jaw, which makes a small angle with the vertical, is arranged stationarily. In this machine, the nuts are fed by means of a slide likewise actuated by a cam-wheel and a lever. The apparatus is so constructed that the nuts come between the jaws when the movable jaw moves a little backward. Hereupon the jaw moves forward, opens the nut and now moves backward a greater distance, in order that the cracked nut shall be able to fall down between the jaws. Thus although a relatively small movement is required and is sufficient for the cracking itself, yet the stroke of the movable jaw must be fairly great in order to allow the cracked nuts to pass through. This long stroke corresponds to a cam-wheel with comparatively high cam-projections, the speed of which thus should not exceed a predetermined value, in order that excessive wear and knocking of the machine parts may be avoided. The same applies to the movement of the slide serving for feeding. The whole machine is thus restricted to a comparatively low speed, whereby its useful effect is interfered with.

The machine forming the subject of my invention obviates this disadvantage. In this machine the jaw with a vertical pressing surface simultaneously forms the jaw whose motion effects the breaking. Its stroke, which is adjustable, is very small and amounts to about 5 millimeters or less. The other inclined jaw is supported so as to be capable of oscillating and, at suitable intervals of time, by reason of its own weight or by the action of a spring, moves away from the vertical jaw, in order to permit the passage through of the broken nuts.

The feeding device for the nuts is very simple and consists of an endless chain or band, which is provided with pins arranged at definite distances apart. These pins lift the nuts out of a charging hopper and throw them between the jaws. The whole machine is adapted to run at a high speed. Consequently reciprocating parts are avoided as far as possible, or their stroke is reduced to a minimum.

One constructional form of the machine forming the subject of the invention is shown by way of example in the accompanying drawings wherein:—

Figure 2:
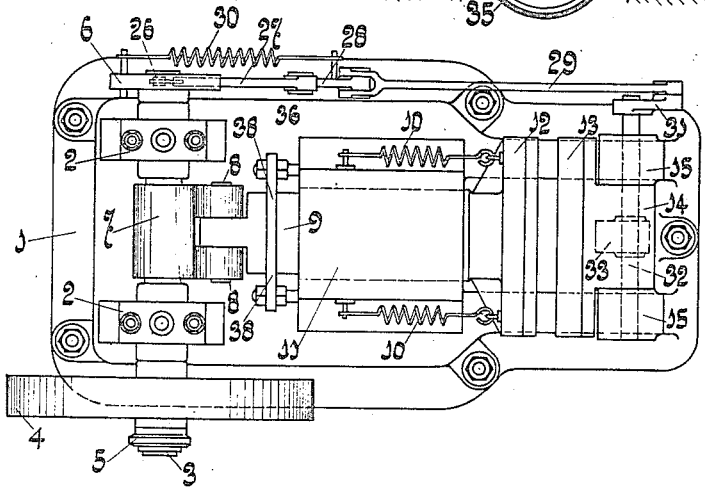

Figure 1 is a longitudinal section and
Fig. 2 a plan of the machine.
Fig. 3 is a front elevation of the feed-device for the nuts.

In bearings 2 on the frame 1 turns the main shaft 3, on which there are arranged a fly-wheel 4, a sprocket-wheel 5, a cam-wheel 6 and a circular eccentric 7. The eccentric 7 acts on rollers 8 which are rotatably mounted on, in line with the major axis of, a slide 9 adapted to be drawn back by means of springs (preferably arranged, as shown, in the same horizontal plane as the axis of the main shaft), that is to say drawn together with the rollers 8, directly on to the eccentric 7 and to move in a guideway 11 on the frame.

The broad end of the slide forms a vertical jaw 12, the pressing surface of which is made of a suitable material and is preferably ribbed, in order that the nuts shall not be forced up and out of the jaws.

The second obliquely-arranged jaw 13 is pivotally mounted at 14 in bearings 15 on the frame.

Above the opening between the jaws, there terminates the feed-hopper 16, into which the nuts are thrown by means of a feed-device that consists of wheels 17, over which runs an endless chain 19 provided with transverse bars 20 arranged at definite distances from each other.

These transverse bars are each provided with two pins 21 which slide in slots 23 formed in the bottom or in the front wall 22 of the feed-hopper and each time they traverse these slots they raise a nut and throw it into the feed-hopper 16. The upper wheels 17 are driven from the main shaft by means of an endless chain 24 passed over the wheels 5 and 25. The velocity-ratio of the wheels 5 and 25 is chosen in accordance with the number of grippers 20, 21 on the feed-device.

Against the cam-wheel 6 rests the roller 26 of a bell-crank lever 27, 28, the fulcrum of which is pivotally mounted on the frame 1. The arm 28 of the bell-crank lever is connected at its free end to a rod 29 and is acted upon by a spiral spring 30 (which is secured to the frame), in such a manner that the roller 26 on the other arm 27 is held against the cam-wheel 6. The rod 29 is connected at its other end to a pivotally mounted arm 31 on a transverse shaft 32 which has a cam 33 in the middle of the frame. The cam 31 presses against the oscillatory jaw 13 and holds it in the position shown in Fig. 1.

Beneath the jaws there is arranged an outlet-hopper 34 through which the broken nuts are conducted into a channel 35 from which they are removed in any suitable manner.

Moreover on both sides of the guideway 11 of the slide there are arranged set-bolts 36 whereby a bar 38, which lies opposite a projection 37 on the slide, can be adjusted. Thus the outermost position into which the slide 9 can be drawn by the springs 10 and consequently also the stroke of the slide can be very accurately adjusted to any value lying between zero and the eccentricity of the eccentric 7.

The number of adjacently arranged feed devices serving for the feeding of the nuts is three in the machine shown (Fig. 3). In practice, however, in order to increase the capacity of the machine, any desired larger number can be employed. Also the machine can be made double for the same purpose. In this case, a breaking device with accessory parts is also arranged on the other side of the main shaft 1, which derive their motion from the same shaft.

The operation of the machine is as follows:—

A nut brought up by the feed-device falls between the jaws at the moment at which the highest point of the eccentric 7 passes the vertical, that is to say, when the main shaft has turned through more than a quarter-revolution from the position shown in Fig. 1. At this moment the cam-wheel 6 has pressed the roller 26 down and the jaw 13 is in the position shown in Fig. 1, which position may be termed the "closed position." If the eccentric has its highest point turned to the left the jaws are charged and the nuts are in their correct position between the jaws 12 and 13. The slide 9 with the jaw 12 is then moved forward, if the stroke of the slide has not been reduced by the set-bolt 36, in which case the highest point of the eccentric runs freely during a part of a revolution of the cam shaft and the forward motion of the jaw 12 only begins later.

The breaking of the shell is completed as soon as the eccentric is in the position in Fig. 1. Directly after this, the roller 26 passes into the depression in the cam-wheel, whereby the jaw 13 is released from the cam 33 and swings back by reason of its own weight (or by a spring), so that the broken nut falls through the hopper 34 into the channel 35. The opening of the jaws however lasts at the most for a quarter of a revolution so that before the following nut falls between the jaws the latter are again closed.

The velocity-ratio of the wheels 5 and 25 in the machine described corresponds to the number of pairs of pins per feeding device and is four to one. Obviously another velocity-ratio can be selected for the transmission gear and for the number of pairs of pins of the feed device. This velocity-ratio should always be such that, after a single revolution the following pair of pins 21 always takes up the same position as the preceding pair at the beginning of the revolution.

What I claim is:

1. A machine for cracking nuts, comprising a frame having a horizontal guide-way, a slide movable in said guideway, a jaw mounted on said slide and formed with a vertical pressing surface, a main shaft rotatably mounted on said frame, a circular eccentric on said shaft, means for yieldingly holding said slide in direct axial engagement with said eccentric, a second jaw pivotally mounted on said frame and having a pressing surface inclined downward toward the first-mentioned jaw, said second jaw being outwardly movable relatively to the first jaw to effect the release of the cracked nuts, a cam for intermittently holding said second jaw in a predetermined position in proximity to the horizontally-movable jaw and for permitting the outward movement of the second jaw and gearing connecting said cam with the main shaft.

2. A machine for cracking nuts, comprising a frame having a horizontal guide-way, a slide movable in said guide-way, a jaw with a vertical pressing surface mounted on said slide, a main shaft rotatably mounted on said frame, a circular eccentric on said shaft, a roller on said slide, springs in the same horizontal plane as the axis of the main shaft for yieldingly holding said roller in contact with said eccentric, a second jaw pivotally mounted on said frame and having a pressing surface inclined downward toward the first-mentioned jaw, said second jaw being outwardly movable relatively to the first jaw to effect the release of the cracked nuts, an oscillatory cam for intermittently holding the second jaw in a predetermined position in proximity to the first-mentioned jaw and for permitting the outward movement of the second jaw, linkwork connected to the oscillatory cam, and a cam on the main shaft for actuating said oscillatory cam through said linkwork.

In testimony whereof I have hereunto set my hand in presence of two subscribing witnesses.

JOSUA CORNELIS HENDRIKUS VAN DUYL.

Witnesses:
THEODORUS J. M. WILL,
J. W. FAFIE.